United States Patent
Hutzel et al.

(10) Patent No.: US 6,648,477 B2
(45) Date of Patent: Nov. 18, 2003

(54) REARVIEW MIRROR ASSEMBLY WITH INFORMATION DISPLAY

(75) Inventors: Barry W. Hutzel, Holland, MI (US); Rick Mousseau, Holland, MI (US); Darryl P. DeWind, Holland, MI (US)

(73) Assignee: Donnelly Corporation, Holland, MI (US)

( * ) Notice: Subject to any disclaimer, the term of this patent is extended or adjusted under 35 U.S.C. 154(b) by 31 days.

(21) Appl. No.: 09/899,474

(22) Filed: Jul. 5, 2001

(65) Prior Publication Data

US 2002/0005999 A1 Jan. 17, 2002

Related U.S. Application Data

(60) Provisional application No. 60/216,295, filed on Jul. 6, 2000.

(51) Int. Cl.[7] .......................... G02B 17/00; G02B 27/00
(52) U.S. Cl. ........................ 359/604; 359/601; 362/494
(58) Field of Search ................................. 359/630, 640, 359/872; 362/494

(56) References Cited

U.S. PATENT DOCUMENTS

| | | | |
|---|---|---|---|
| 4,588,267 A | 5/1986 | Pastore | 350/600 |
| D289,989 S | 5/1987 | Skogler et al. | D12/188 |
| 4,807,096 A | 2/1989 | Skogler et al. | 362/142 |
| D300,312 S | 3/1989 | Skogler et al. | D12/188 |
| 4,882,565 A | 11/1989 | Gallmeyer | 340/461 |
| D328,587 S | 8/1992 | Arbisi | D12/187 |
| 5,253,109 A | 10/1993 | O'Farrell et al. | 359/604 |
| 5,285,060 A | 2/1994 | Larson et al. | 250/214 |
| D351,370 S | 10/1994 | Lawlor et al. | D12/187 |
| 5,406,414 A | * 4/1995 | O'Farrell et al. | 359/604 |
| 5,521,760 A | 5/1996 | De Young et al. | 359/601 |

(List continued on next page.)

FOREIGN PATENT DOCUMENTS

| | | | |
|---|---|---|---|
| EP | 615882 A2 | 3/1994 | ............. B60R/1/04 |
| GB | 2292857 | 3/1996 | ............. H04B/1/08 |
| GB | 2297632 | 8/1996 | ............. B60R/1/08 |
| WO | WO 8202448 | 7/1982 | ........... G08B/19/00 |

OTHER PUBLICATIONS

Commonly assigned, co-pending U.S. patent application, Ser. No. 09/817,874, entitled Interactive Automotive Rearvision System, filed Mar. 26, 2001, by Chad D. Quist et al.
Commonly assigned, co-pending U.S. patent application, Ser. No. 09/433,467, entitled Vehicle Interior Mirror Assembly, filed Nov. 4, 1999, by Patrick Heslin et al.
Commonly assigned, co-pending U.S. patent application, Ser. No. 09/533,127, entitled Toggle Assembly for Rearview Mirror, filed Mar. 23, 2000, by Ralph A. Spooner et al.
Commonly assigned, co-pending U.S. patent application, Ser. No. 09/585,379, entitled Rearview Mirror Assembly with Utility Functions, filed Jun. 1, 2000, by Barry W. Hutzel et al.

*Primary Examiner*—Ricky Mack
*Assistant Examiner*—Brandi N Thomas
(74) *Attorney, Agent, or Firm*—Van Dyke, Gardner, Linn & Burkhart, LLP

(57) ABSTRACT

An interior rearview mirror assembly provides a display system for displaying light or information to a driver of a vehicle. The display includes a refractive light directing element, which may include a prismatic display lens which refracts and directs the light of the display message downwardly and/or sidewardly toward a driver of the vehicle for improved viewing of the display message by the driver of the vehicle. The display system is mountable to a printed circuit board positioned within the case of the mirror assembly. The printed circuit board may also be connected to a pair of illumination sources positioned at a lower portion of a casing of the mirror assembly.

28 Claims, 3 Drawing Sheets

U.S. PATENT DOCUMENTS

| | | | |
|---|---|---|---|
| 5,530,240 A | 6/1996 | Larson et al. | 250/214 |
| 5,572,354 A | 11/1996 | Desmond et al. | 359/265 |
| 5,576,687 A | 11/1996 | Blank et al. | 340/438 |
| 5,649,756 A | 7/1997 | Adams et al. | 362/83.1 |
| 5,669,698 A | 9/1997 | Veldman et al. | 362/83.1 |
| 5,673,994 A * | 10/1997 | Fant et al. | 362/494 |
| D390,524 S | 2/1998 | DeLine et al. | D12/187 |
| D391,214 S | 2/1998 | Hook et al. | D12/187 |
| 5,760,962 A | 6/1998 | Schofield et al. | 359/604 |
| 5,786,772 A | 7/1998 | Schofield et al. | 340/903 |
| 5,812,321 A | 9/1998 | Schierbeek et al. | 359/601 |
| 5,820,245 A | 10/1998 | Desmond et al. | 362/83.1 |
| D400,481 S | 11/1998 | Stephens et al. | D12/187 |
| 5,877,897 A | 3/1999 | Schofield et al. | 359/604 |
| 5,940,503 A | 8/1999 | Palett et al. | 379/454 |
| 6,026,162 A | 2/2000 | Palett et al. | 379/454 |
| 6,045,243 A * | 4/2000 | Muth et al. | 362/494 |
| 6,087,953 A | 7/2000 | DeLine et al. | 340/815.4 |
| 6,124,647 A | 9/2000 | Marcus et al. | 307/10.1 |
| 6,172,613 B1 | 1/2001 | DeLine et al. | 340/815.4 |
| 6,243,003 B1 | 6/2001 | DeLine et al. | 340/425.5 |
| 6,278,377 B1 | 8/2001 | DeLine et al. | 340/815.4 |
| 6,290,378 B1 * | 9/2001 | Buchalla et al. | 362/494 |
| 6,318,870 B1 * | 11/2001 | Spooner et al. | 359/872 |
| 6,329,925 B1 * | 12/2001 | Skiver et al. | 359/604 |
| 6,386,742 B1 * | 5/2002 | DeLine et al. | 362/494 |
| 6,412,973 B1 * | 7/2002 | Bos et al. | 362/494 |
| 2002/0159270 A1 * | 10/2002 | Lynam et al. | 362/492 |
| 2003/0002179 A1 * | 1/2003 | Roberts et al. | 359/838 C |

* cited by examiner

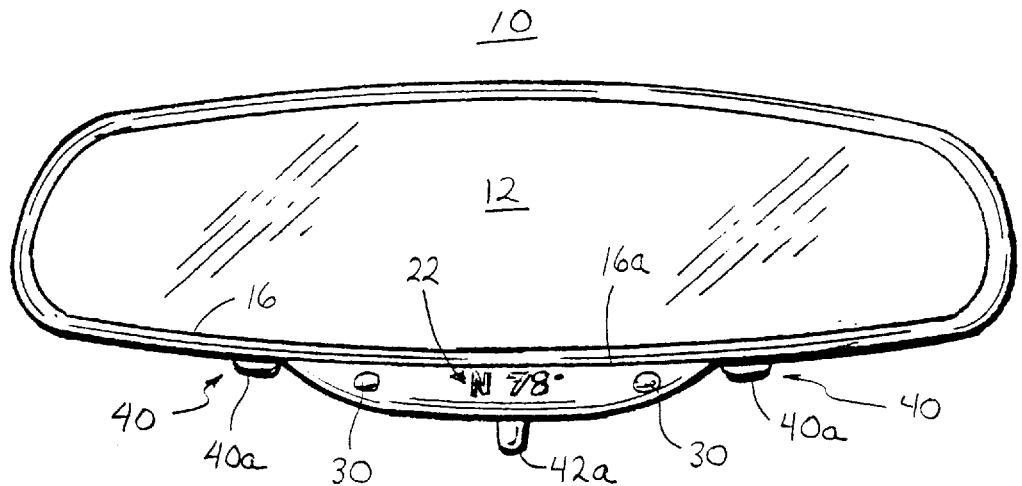
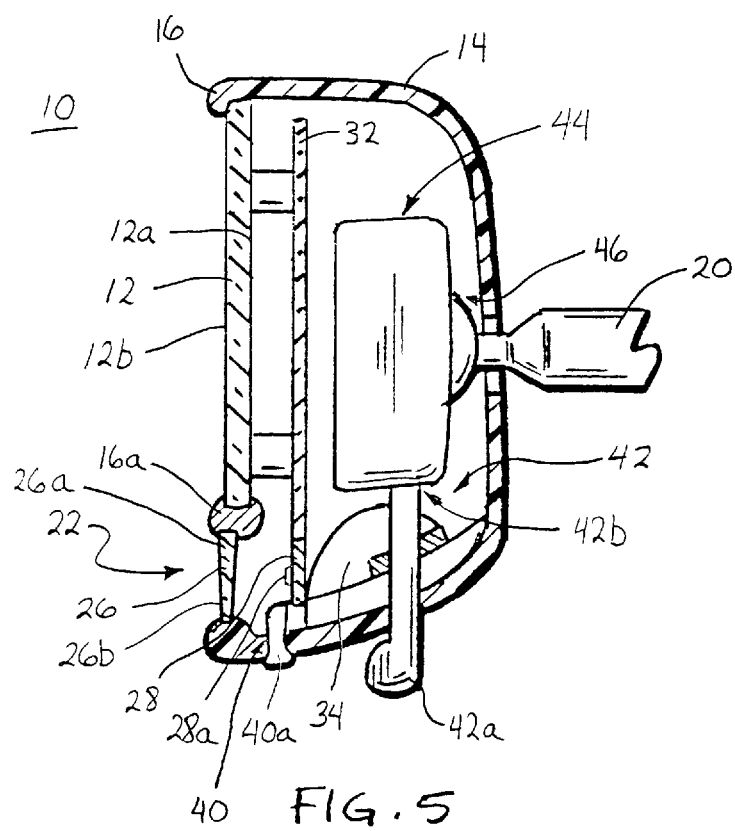

REARVIEW MIRROR ASSEMBLY WITH INFORMATION DISPLAY

CROSS-REFERENCE TO RELATED APPLICATION

The present application claims priority from U.S. Provisional Application, Ser. No. 60/216,295, filed Jul. 6, 2000 by Barry W. Hutzel, entitled REARVIEW MIRROR ASSEMBLY WITH INFORMATION DISPLAY (Attorney Docket No. DON01 P-797), which is hereby incorporated herein by reference in its entirety.

FIELD OF THE INVENTION

The present invention relates generally to interior rearview mirror assemblies and, more particularly, to an interior rearview assembly which includes an information display element at a perimeter of a mirror reflective element of the mirror assembly.

BACKGROUND OF THE INVENTION

Interior rearview mirrors of vehicles may include a display at a reflective element of the mirror assembly, such as on or behind the reflective element, for displaying information with respect to the status of the vehicle or an accessory of the vehicle. Many of these displays are positioned forwardly of the reflective element of the mirror assembly with respect to the vehicle, and project through the reflective element in a direction generally normal to the base of the reflective element. This results in the information being projected in a direction that is not directly toward the driver of the vehicle.

SUMMARY OF THE INVENTION

The present invention is intended to provide an interior rearview mirror assembly which includes a display for providing information to a driver of the vehicle. The display includes a light source and a light directing element, such as a refractive light directing element and preferably a prismatic display lens. The light directing element functions to refract and redirect light from the display generally downwardly and/or sidewardly toward a driver of the vehicle.

According to an aspect of the present invention, an interior rearview mirror assembly for a vehicle includes a mirror case having a reflective element, a display element and a refractive light directing element. The mirror case is adapted to mount to the vehicle. The display element is positioned within the mirror case and is operable to project light in a direction generally rearwardly with respect to the vehicle. The refractive light directing element is positioned at a perimeter of the reflective element and rearwardly of the display element. The refractive light directing element refracts the light or display from the display element generally downwardly and rearwardly toward a driver of the vehicle.

In one form, the interior rearview mirror assembly is a prismatic mirror assembly and is adjustable between a high reflectivity, day position and a low reflectivity, night position via a toggle assembly. Preferably, the toggle assembly comprises a toggle handle or knob, which comprises a soft touch material, in order to improve the feel of the toggle handle to a user of the rearview mirror assembly.

In another form, the interior rearview mirror assembly includes light assemblies positioned at a lower region of the case. The light assemblies are operable to illuminate a targeted region of the cabin of the vehicle and include a bulb, a housing and a cover. Preferably, the light assemblies are interchangeable such that a right light assembly and a left light assembly comprise common parts.

Therefore, the present invention provides an interior rearview mirror assembly which is operable to provide a substantially non-distorted display in a direction generally toward a head of a driver of a vehicle. The display is refracted through a refractive light directing element to direct the display generally downwardly and/or sidewardly toward the driver. The toggle assembly of the mirror assembly provides improved comfort to a user of the mirror assembly. The present invention provides for reduced parts proliferation and improved manufacturing efficiency of the mirror assembly.

These and other objects, advantages, purposes and features of this invention will become apparent upon review of the following specification in conjunction with the drawings.

BRIEF DESCRIPTION OF THE DRAWINGS

FIG. 3 is a rear elevation of the mirror assembly of the present invention, taken in a direction generally forwardly with respect to the vehicle;

FIG. 5 is a sectional view of the mirror assembly, taken along the line V—V in FIG. 3.

DESCRIPTION OF THE PREFERRED EMBODIMENTS

Figure 1:
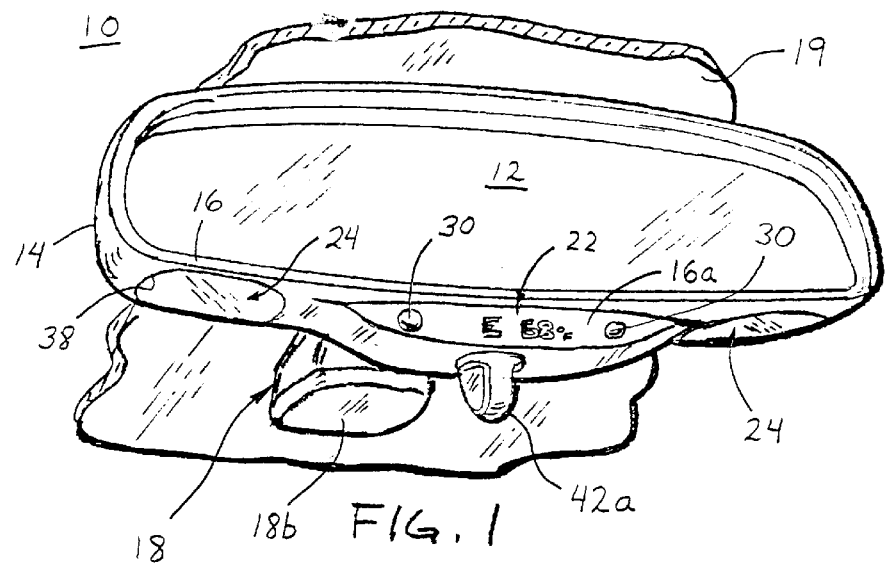
FIG. 1 is a lower perspective view of a mirror assembly of the present invention, taken in a direction generally forwardly with respect to the vehicle.

Referring now to the drawings and the illustrative embodiments depicted therein, an interior rearview mirror assembly 10 for a vehicle includes a reflective element 12, a case or housing 14, and a bezel 16 (FIGS. 1 and 3–5). Mirror assembly 10 may be mounted to a mounting base 18 at an interior surface of a vehicle windshield 19 via a mounting arm 20, which is pivotably secured to both mounting base 18 and case 14, as discussed below. Mirror assembly 10 further includes a display 22 at a perimeter of reflective element 12, preferably at a lower chin region 16a of bezel 16 and case 14, as shown in FIGS. 1 and 3. Display 22 includes a light directing element 26, such as a refractive light directing element, which may include a wedge or prism shaped lens to direct light or information from a display element 28 (FIGS. 4 and 5) downwardly and/or laterally sidewardly toward the driver of the vehicle, as discussed in detail below. Preferably, mirror assembly 10 further includes a pair of map reading lights 24, which are actuatable to provide illumination in the direction generally downwardly and toward a lap area of a driver and/or passenger of the vehicle.

Figure 4:
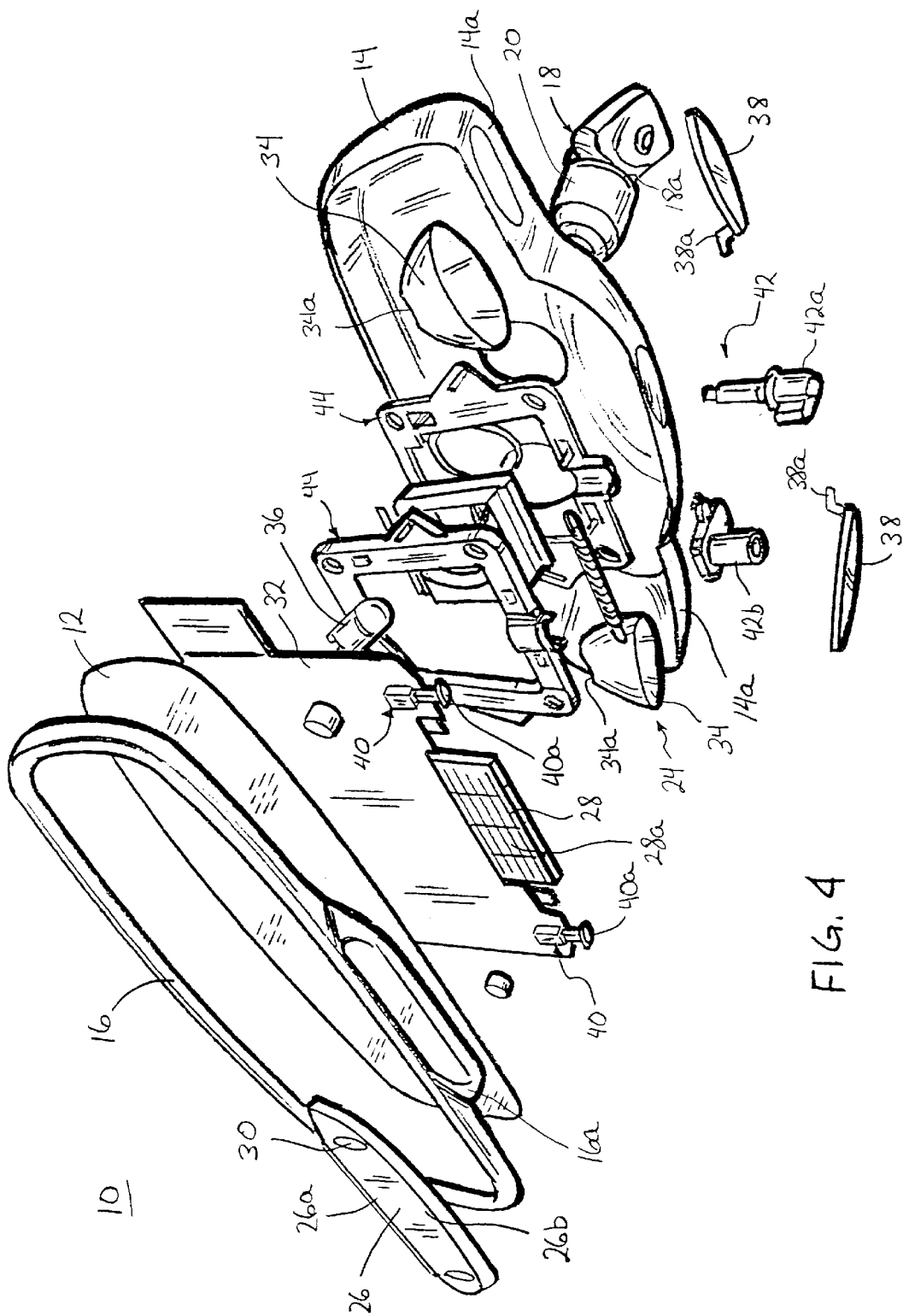
FIG. 4 is an exploded perspective view of the mirror assembly of the present invention.

Display 22 is operable to project light or information toward a driver of the vehicle and may display status information of the vehicle or an accessory of a vehicle. For example, display 22 may display information with respect to a global positioning system (GPS), compass system, temperature gauge, or the like. It is envisioned that mirror assembly 10 may include a mirror-based global positioning system, such as the type disclosed in commonly assigned, co-pending U.S. provisional application, Ser. No. 60/187, 960, filed Mar. 9, 2000 by McCarthy et al. for COMPLETE MIRROR-BASED GLOBAL POSITIONING SYSTEM (GPS) NAVIGATION SOLUTION (Attorney Docket No. DON01 P-810), and U.S. pat. application Ser. No. 09/799,414, filed Mar. 5, 2001 (Attorney Docket No. DON01 P-887), the disclosures of which are hereby incorporated herein by reference. Display 22 preferably provides information by way of alpha numeric indicia or symbolic or graphical indicia, such as icons, and may provide passenger safety information, such as passenger side inflatable restraint (PSIR) status or supplemental inflatable restraint (SIR) status. One or more control inputs 30, such as buttons or switches, may be positioned at or near display 22 and may be operable to activate and deactivate the display and/or toggle between displays or units of displays, such as between Fahrenheit and Celsius temperature readings. It is further envisioned that control inputs 30 may be backlit or otherwise illuminated by an illumination source (not shown), such as an LED or the like, positioned at a circuit board 32 adjacent to the buttons or switches (FIGS. 4 and 5). Control inputs 30 may otherwise function to activate or deactivate one or more other accessories associated with mirror assembly 10 and/or the vehicle.

Preferably, as shown in FIG. 4, display element 28 may be removably mounted to a printed circuit board 32 positioned within case 14 of mirror assembly 10. During manufacture of the mirror assembly, an appropriate display element, such as one that provides a compass heading and temperature reading, may be affixed to circuit board 32 to provide the appropriate display function for the options selected for that particular mirror assembly and associated vehicle. This substantially improves the manufacturing process of the mirror assembly, since each mirror assembly may include a common printed circuit board and other components, with only the display element being snapped or otherwise secured to the printed circuit board prior to installation of the circuit board in the mirror case of the mirror assembly. This facilitates implementation of common parts of the assemblies, thereby reducing part proliferation in the assembly plant, which provides cost savings as well as improved and more efficient assembly plant processes.

Refractive light directing element or lens 26 of display 22 is preferably secured at lower chin area 16a of bezel 16, such that light directing element 26 is positioned immediately rearwardly of display element 28 when mirror assembly 10 is fully assembled, as shown in FIG. 5. Light directing element 26 is prism or wedge shaped, such that an upper portion 26a of light directing element 26 is thicker than a lower portion 26b of light directing element 26. This causes the light emitted from display element 28 to be refracted through light directing element 26 such that the information being projected or displayed by display 22 is directed downwardly with respect to the face of mirror assembly 10. This provides a display system which projects or otherwise displays the information substantially directly toward the head of the driver of the vehicle, thereby providing improved visibility of the display and requiring a lower level of illumination by the display. The thickness dimensions of the refractive light directing element 26 are selected to provide an appropriate downward angle toward a typical location of a driver's head when the mirror assembly is adjusted for proper rearward viewing by the driver. Optionally, the thickness of the refractive light directing element 26 may also vary laterally across the lens, to further angle or direct the display laterally or sidewardly toward the head of the driver. The refractive light directing element of the present invention thus provides a substantially non-distorted display which is directed directly toward the head of the driver, and thus is highly visible to the driver in all driving conditions.

Preferably, display element 28 provides illumination via at least one light emitting source 28a (FIGS. 4 and 5), such as a light emitting diode (LED), an electro-illuminescent source, an organic polymeric emitting source, a vacuum fluorescent light source or an incandescent light source. The light emitting source of the display element may comprise individual light emitting light segments or elements that are arranged to create indicia when selectively illuminated. Alternately, the light emitting source may be positioned behind a mask in such a manner that the mask forms the indicia when the mask is viewed by the observer or driver of the vehicle. Preferably, the circuit board 32 includes appropriate display electrical drivers and/or connections for illumination of the illumination source and/or the display in response to an electrical signal from the vehicle.

Mirror assembly 10 preferably includes a pair of illumination sources 24 mounted at a lower region of case 14, preferably positioned toward the laterally opposite sides thereof, such that when activated, the lights provide illumination in a generally downwardly direction from mirror assembly 10, as is known in the art. Light assemblies 24 provide light for the interior of the vehicle and may comprise map reading lights or dashboard illumination lights. As shown in FIG. 4, light assemblies 24 each include a dome shaped reflector housing 34 and a light lens or cover 38. Reflector housings 34 may include mounting tabs (not shown) which engage the back wall of the case to retain the reflectors in the mirror case 14. Reflectors 34 each include an opening 34a to receive a respective light bulb 36 therein. Reflectors 34 preferably comprise a housing molded from resinous polymeric or plastic material and, more preferably, polycarbonate housings, for example, LEXAN 121, and are provided with a reflective coating, and more preferably, are vacuum metalized. Preferably, light bulbs 36 comprise incandescent bulbs and are supported by reflective housings 34, which may be connected to circuit board 32. Alternately, light bulbs 36 may be mounted and supported at circuit board 32 and project into reflective housings at a downward angle from the circuit board, without affecting the scope of the present invention. Preferably, bulbs 36 are mountable within the reflectors 34, such that the map light unit comprising the reflector and bulb may be installed within case 14 and attached to circuit board 32 as a light unit, to further improve the manufacturing processes of mirror assembly 10. Preferably, the bulbs 36 may be easily removed from map lights 24 for replacement via an elongated L-shaped bulb removal hook or arm 38a, such as an arm of the type disclosed in commonly assigned, co-pending U.S. pat. application Ser. No. 09/448,700, filed Nov. 24, 1999, by Skiver et al. for REARVIEW MIRROR ASSEMBLY WITH ADDED FEATURE MODULAR DISPLAY, the disclosure of which is hereby incorporated herein by reference.

Alternately, bulbs 36 may comprise non-incandescent light sources. For example, a cluster or plurality of at least four, more preferably at least six, LEDs may be used, which most preferably direct white light to a targeted area. Light assemblies 24 may include a variety of emitting sources, such as high intensity amber and reddish orange light emitting diode sources, such as solid state light emitting diode sources utilizing double hydro junction AIGaAs/GaAs Material Technology, such as very high intensity red LED lamps T/I: (5 mm) HLMP-4100/4101, available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue or white LEDs can be used, or a combination of individual different colored diodes can be used, with the color mixing therefrom to form a desired color. Optionally, a plurality of LEDs, such as a cluster of four, six, eight or the like LEDs can be used to target and illuminate a local area for higher illumination at that area, such as may be useful in a map reading light (most preferably illuminating the target area with white light).

Figure 2:
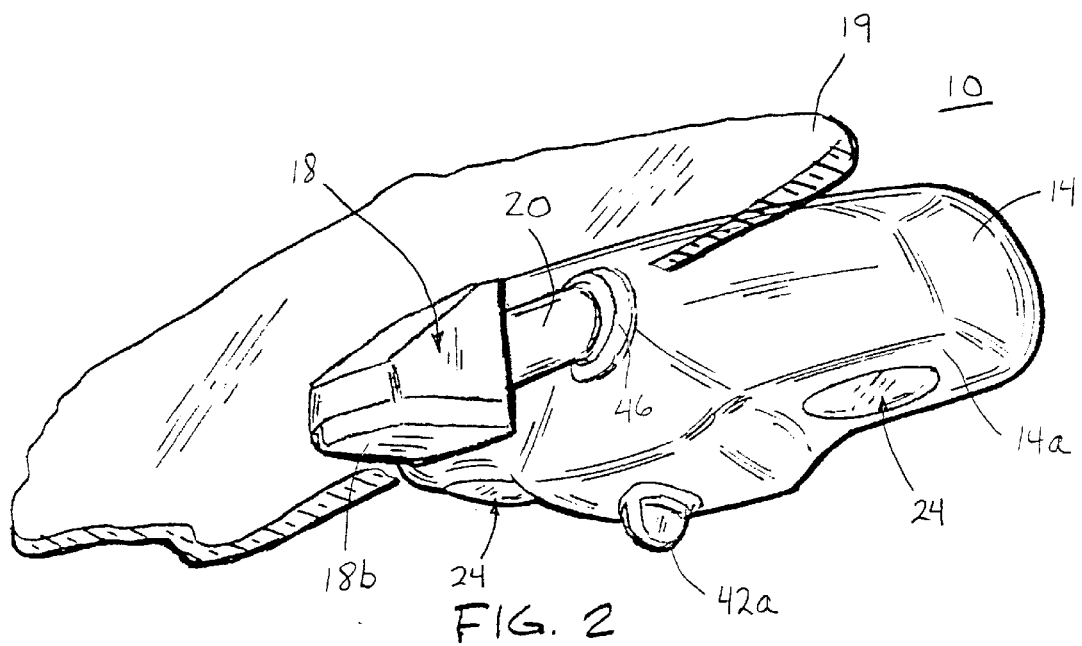
FIG. 2 is a lower perspective view of the mirror assembly of FIG. 1, taken in a direction generally rearwardly with respect to the vehicle.

Preferably, case 14 is curved along lower side regions 14a, such that the side regions curve and slope forwardly and upwardly toward the windshield of the vehicle, as best seen in the FIGS. 2 and 4. Such positioning avoids light from light assemblies 24 being directed into the eyes of the vehicle driver, thereby avoiding unwanted glare. Preferably, light covers 38 are common parts, and are curved in accordance with lower region 14a of case 14. The light covers 38 are thus interchangeable left to right, thereby improving the manufacturing process of mirror assembly 10, since the wrong light cover cannot be installed at the wrong side of the mirror assembly. This further reduces the number of part numbers for the mirror assembly, since the same light cover is used on both sides.

Covers 38 preferably comprise transparent lens covers and, more preferably, optical lens covers preferably formed from polymer materials, such as polycarbonate or acrylic materials. For example, covers 38 may include pyramid optics which hide the light bulb positioned in the reflective housing 34, and may further include optics to direct light at desired locations within the vehicle. Optionally, covers 38 may comprise clear parabolic lenses. Preferably, covers 38 are semi-circular shaped and include flexible flanges or fingers (not shown) engaging and snapping to the bottom wall 14a of case 14. Additionally, each cover 38 preferably includes the elongated, L-shaped arm 38a which can be used to retrieve bulbs 36 from bulb holder 34 when bulbs 36 burn out or are no longer functional.

Light assemblies 24 are actuated by control inputs or switches 40, which are also preferably mounted to circuit board 32. Switches 40 include telescoping plungers or buttons 40a which extend downwardly from circuit board 32, and may be angled to extend through a lower or bottom wall 14a of case 14. Examples of other light assemblies, such map reading lights or the like, which may be incorporated into case 14 of mirror assembly 10, are described in commonly assigned U.S. Pat. Nos. 5,669,698; 5,820,245; 5,671,996; 5,813,745; 5,178,448; 4,733,336; and 4,646,210; and co-pending U.S. pat. application Ser. No. 09/448,700, filed Nov. 24, 1999 by Skiver et al., for REARVIEW MIRROR ASSEMBLY WITH ADDED FEATURE MODULAR DISPLAY, the disclosures of all of which are hereby incorporated herein by reference.

In the illustrated embodiment, mirror assembly 10 is a prismatic mirror assembly, which is pivotable via actuation of an actuator or toggle 42 to change a position of the prismatic reflective element 12 from a high reflectivity, day viewing position, whereby light is reflected to the user's eye from a highly reflective surface 12a of reflective element 12, to a reduced reflectivity or partial reflectance, night viewing position, whereby a reduced amount of light is reflected toward the user from an uncoated front surface 12b of reflective element 12 (FIG. 5). Preferably, toggle 42 comprises a knob 42a and a cam 42b, which is pivotably positioned within a bracket assembly 44, such that rotation of knob 42a causes pivoting of mirror case 14, including bezel 16 and reflective element 12, relative to mounting arm 20 and mounting base 18, as disclosed in commonly assigned U.S. pat. application Ser. No. 09/448,700, filed Nov. 24, 1999 by Skiver et al. for REARVIEW MIRROR ASSEMBLY WITH ADDED FEATURE MODULAR DISPLAY, which is hereby incorporated herein by reference. Alternately, toggle assembly 42 may be of the type disclosed in commonly assigned, co-pending U.S. pat. application Ser. No. 09/533,127, filed Mar. 23, 2000 by Ralph A. Spooner and Jerry L. Beck, entitled TOGGLE ASSEMBLY FOR REARVIEW MIRROR (Attorney Docket No. DON01 P-792), the disclosure of which is hereby incorporated herein by reference.

Preferably, actuator knob 42a of toggle 42 comprises a soft touch material on or at an outer surface thereof, to provide a more comfortable feel of the knob to the user of the mirror assembly. Preferably, the soft touch material is molded over a harder, rigid plastic material, preferably in a second shot of a two shot molding process. The soft touch material may comprise a soft material, such as polyolefin or other similar thermoplastic materials, such as santoprene or the like, and preferably has a material hardness of less than approximately 70 Shore A Durometer hardness, and more preferably, less than approximately 50 Shore A Durometer hardness. The inner, rigid plastic material may comprise a more rigid thermoplastic material or a thermoset, such as nylon or the like, and preferably has a material hardness of greater than approximately 70 Shore A Durometer hardness.

As shown in FIGS. 1 and 2, mirror assembly 10 is mounted to an interior surface of a windshield of a vehicle via a mounting base or mount 18, typically secured via a windshield mounting button (not shown) adhered to the inner surface of the windshield in a conventional fashion, and a mounting arm 20 pivotally mounted between mounting base 18 and case 14 of mirror assembly 10. In the illustrated embodiment, mounting arm 20 comprises a ball member at each opposite end of mounting arm 20, whereby the ball members are pivotally received within sockets 18a (FIG. 4) and 46 (FIGS. 2 and 5) of mounting base 18 and case 14, respectively. Mounting arm 20 may further include a channel or passageway (not shown) therethrough or therealong for routing electrical wiring to provide electrical power and control to mirror assembly 10 from a vehicle wiring (not shown) within the vehicle. Mounting arm 20 may be of the type disclosed in commonly assigned, co-pending U.S. pat. application Ser. No. 09/470,791, filed Dec. 23, 1999 by Jonathon E. Deline, entitled REARVIEW MIRROR MOUNTING ASSEMBLY, now U.S. Pat. No. 6,540,193 (Attorney Docket No. DON1 P-790), the disclosure of which is hereby incorporated herein by reference. Mirror assembly 10 thus provides pivotal movement of case 14 relative to mounting arm 20, and further provides pivotal movement of mounting arm 20 relative to mounting base 18. This facilitates adjustment of case 14 and reflective element 12 relative to the vehicle in order to provide proper rearward viewing by a driver of the vehicle.

Optionally, as shown in FIGS. 1 and 2, mounting base 18 may further include an accessory housing 18b, such as for a microphone or the like. The microphone may be of the type disclosed in commonly assigned, co-pending U.S. pat. application Ser. No. 09/382,720, entitled ACCESSORY MODULE FOR VEHICLE, filed on Aug. 25, 1999 by Jonathon E. DeLine and Niall R. Lynam (Attorney Docket No. DON01 P-768), the disclosure of which is hereby incorporated herein by reference. Alternately, the mounting base 18 may include other accessories, such as a rain sensor, camera, compass system, or any other accessory which may be positioned within the housing of mounting base 18, without affecting the scope of the present invention. Optionally, mirror assembly 10 may also or otherwise include various utility functions, such as a storage space for holding or housing various accessories, of the types disclosed in commonly assigned, co-pending U.S. patent application Ser. No. 09/449,121, filed Nov. 24, 1999 by Hutzel et al., and/or commonly assigned, co-pending U.S. patent application filed Jun. 1, 2000 by Hutzel et al. for REARVIEW MIRROR ASSEMBLY WITH UTILITY FUNCTIONS (Attorney Docket No. DON01 P-817), the disclosures of which are hereby incorporated herein by reference.

Optionally, the mirror assembly may include a video screen, such as of the type disclosed in commonly assigned U.S. patent application Ser. No. 09/793,002, filed Feb. 26, 2001 by Schofield et al. for VIDEO MIRROR SYSTEMS INCORPORATING AN ACCESSORY MODULE (Attorney Docket No. DON01 P-869), which is hereby incorporated herein by reference. Display 22 and/or any such video displays and/or video display mirrors may include light emitting sources, such as light emitting diodes, to provide a visible signal, back lighting and/or local illumination. For example, light emitting diodes can provide low level non-incandescent white light or non-white light for illuminating indicia. However, it should be understood that other LEDs providing light and colors other than white, such as amber, red, blue, yellow, green, orange or the like may be used. Alternately, other light emitting elements can be used to illuminate the display or display information, such as incandescent displays, vacuum fluorescent displays, electroluminescent displays, light emitting diode displays, cathode ray tube displays, field emission displays, E-ink displays, or organic emitting polymer displays or the like. Examples of displays may be found in co-pending U.S. patent application Ser. No. 09/660,712, entitled INFORMATION DISPLAY FOR VEHICLES, filed Sep. 13, 2000 (Attorney Docket No. DON01 P-843), and U.S. Pat. No. 6,172,613, or U.S. Pat. No. 5,530,240, and U.S. patent application Ser. No. 09/433,467, filed Nov. 4, 1999 by Heslin et al., entitled VEHICLE INTERIOR MIRROR ASSEMBLY (Attorney Docket No. DON01 P-783), commonly assigned to Donnelly Corporation, which are herein incorporated by reference in their entireties. In addition, any video display or video display mirror of the present invention may comprise a touch-sensitive display, such as described in U.S. provisional application entitled INTERACTIVE AUTOMOTIVE REARVIEW SYSTEM, Ser. No. 60/192,721, filed Mar. 27, 2000 (Attorney Docket No. DON01 P-815), and U.S. patent application Ser. No. 09/817,874, filed Mar. 26, 2001 (Attorney Docket No. DON01 P-889), which are hereby incorporated herein by reference.

It is also possible to incorporate low level console or instrumentation lighting for vehicles in any mirror assembly or video display, video mirror display and/or camera assembly by fitting a low level non-incandescent light emitting light source, such as a light emitting diode or the like, for illuminating an instrument panel or console, such as disclosed in commonly assigned U.S. Pat. No. 5,671,996, the disclosure of which is hereby incorporated by reference. A variety of emitting sources can be used, such as high intensity amber and reddish orange light emitting diode sources, such as solid state light emitting diode (LED) sources utilizing double hydro junction AIGaAs/GaAs Material Technology such as very high intensity red (LED) lamps T/1 (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation, of Palo Alto, Calif. Also, blue or white LEDs can be used or a combination of individual different colored diodes can be used with the color mixing therefrom to form a desired color. Optionally, a plurality of LEDs such as a cluster of four, six, eight or the like LEDs can be used to target and illuminate a local area for higher illumination at that area, such as may be useful in a map light (most preferably illuminating the target area with white light).

In applications where the mirror assembly includes a video screen at the mirror reflective element, mirror reflective element 12 may be a bent, wide-angle mirror reflector rather than a flat mirror reflector, as is typically used in interior rearview mirror assemblies. This is in order to compensate for the field of view lost by the portion of the mirror reflector surface occupied by the video screen. If the reflective element is a bent, wide-angle optic reflective element, it is preferable that mirror reflector element 12 comprise a glass substrate coated with a bendable reflector coating (such as of silicon, as described in U.S. Pat. No. 6,065,084 entitled ELEMENTAL SEMICONDUCTOR MIRROR and in co-pending U.S. pat. application entitled ELEMENTAL SEMICONDUCTOR MIRROR FOR VEHICLES AND METHOD OF MAKING SAME, filed May 8, 1998, Ser. No. 09/074,810 (Attorney Docket No. DON01 P-697); and U.S. Pat. Nos. 5,535,056 and 5,751,489, all commonly assigned to Donnelly Corporation of Holland, Mich., the disclosures of which are incorporated by reference herein in their entireties). Also, if a fixed reflectance reflector element is provided, it is preferable that mirror reflector element 12 comprise a bent prismatic mirror element, preferably comprising a bent (either spherically bent or multiradius bent) glass element of prismatic cross-section in its thickness dimension. Also, mirror reflector 12 may comprise a wide-angle optic, bent electro-optic reflective element, preferable an electrochromic reflective element such as a convex, spherically bent electrochromic mirror element or a multiradius (such as aspheric) electrochromic mirror element, such as an electrochromic medium described in commonly assigned U.S. Pat. Nos. 5,140,455 and 5,151,816, or a solid state electrochromic medium, such as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, EDS., Optical Engineering Press, Wash. (1990), the disclosures of which are hereby incorporated by reference herein in their entireties. Other suitable electrochromic reflectors are described in U.S. Pat. Nos. 6,178,034; 6,154,306; 6,002,544; 5,567,360; 5,525,264; 5,610,756; 5,406,414; 5,253,109; 5,076,673; 5,073,012 or 5,117,346, which are all commonly assigned to Donnelly Corporation, the disclosures of which are herein incorporated by reference in their entireties.

Typically, the two glass plates sandwich the electrochromic medium. A reflective coating may be deposited either on the rear-most surface away from the viewer (to create a fourth surface reflector as is known in the art) or disposed on the front surface of the rear-most substrate (to create a third surface reflector as is known in the art). The substrates can be of equal or different glass thicknesses. The electrochromic medium can be a liquid medium or a solid medium, such as a solid polymer matrix electrochromic medium such as is disclosed in U.S. patent application Ser. No. 09/350,930, filed Jul. 12, 1999 by Varaprasad et al., entitled ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES, the entire disclosure of which is hereby incorporated by reference herein. For example, an interior rearview mirror can comprise a 1.1 mm thick front substrate, a 2.0 mm thick rear substrate, and an aluminum silver, silver alloy, aluminum alloy, or the like highly reflective metal film on the front surface of the rear substrate (i.e. third surface reflector) and the electrochromic medium may be solid such as electrochromic Solid Polymer Matrix (SPM)∂ comprising a color changing cross-linked polymer solid film. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, and most preferably equal to or greater than about 2.0 mm thickness. The rear-most surface of the rear substrate (the fourth surface as known in the mirror art) is reflector coated with a high reflecting metal film such as of aluminum or silver, or an alloy of aluminum or silver. Most preferably, the front-most surface of the rear substrate (the third surface as known in the mirror art) is reflector coated with a high reflecting metal film, such as of aluminum or silver, or an alloy of aluminum or silver.

Optionally, the front surface of the front substrate (i.e. the first surface as known in the mirror art) can be coated with a surface coating or otherwise modified so as to reduce the build up of condensation or mist such as can occur in humid climates. For example, the front surface of the front substrate (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system, such as is disclosed in Japanese Pat. Abstract JP11050006A, issued Feb. 23, 1999 to Mitsumasa et al. of Toto Ltd., entitled PRETREATMENT OF SURFACE FORMING PHOTOCATALYTIC HYDROPHILIC FILM AND CLEANING AGENT AND UNDERCOATING COMPOSITION USED THEREIN, and in JP10330131A, issued Dec. 15, 1998 to Tsutomu et al. of Ichikoh Ind Ltd, entitled HYDROPHILIC THIN FILM AND VEHICULAR MIRROR AND GLASS PRODUCT USING THE SAME HYDROPHILIC THIN FILM, and in JP10036144A, issued Feb. 10, 1998 to Toru et al. of Murakami Corporation, entitled ANTIFOGGING ELEMENT, and in U.S. Pat. No. 5,724,187, issued Mar. 3, 1998 to Varaprasad et al. of Donnelly Corporation, entitled ELECTROCHROMIC MIRRORS AND DEVICES, the disclosures of which are hereby incorporated by reference herein. Also, such wetting characteristic modification coatings and techniques, such as photocatalytic hydrophilic coatings, can be used for the first (front-most) surface of a non-electrochromic reflective element, such as a prismatic interior mirror reflective element (and for the first surface of electrochromic exterior mirror reflective elements and of metal coated, such as chromium coated, exterior non-electrochromic mirror reflective elements).

The reflective element coating may comprise a metal thin film reflector (such as of silver, aluminum, silver alloy, metal alloy, chromium, and the like) or a stack of metal thin films (such a rhodium thin film over coating a chromium thin film) or can be a dichroic coating/multilayer (such as is disclosed in U.S. Pat. Nos. 5,014,167 and 5,207,492, the disclosures of which are hereby incorporated by reference in their entireties herein) or a semiconductor reflecting layer such as a silicon reflector layer such as is described in U.S. patent application entitled ELEMENTAL SEMICONDUCTOR MIRROR, Ser. No. 09/533,156, filed Mar. 23, 2000, (Attorney Docket No. DON04 P-809), the disclosure of which is incorporated by reference herein in its entirety.

The reflective element may comprise a variable reflectance element, such as an electro-optic element. In most preferred form, the reflective element comprises an electrochromic mirror element, for example one of several types of electrochromic mirror elements, such as an element of the electrochemichromic type which is disclosed in U.S. Pat. No. 5,140,455, or the solid-state type such as disclosed in, for example, U.S. Pat. Nos. 4,712,879; 5,910,854; and 5,668,663, all commonly assigned with the present application to Donnelly Corporation of Holland, Mich., the disclosures of which are hereby incorporated herein by reference in their entireties. Other suitable electrochromic elements and/or mirror reflector elements are described in U.S. Pat. Nos. 5,151,816 and 5,142,407, and in co-pending U.S. patent applications entitled DIGITAL ELECTROCHROMIC MIRROR SYSTEM, Ser. No. 09/533,260, filed Mar. 20, 2000, (Attorney Docket No. DON01 P-808); DIGITAL ELECTROCHROMIC MIRROR SYSTEM, Ser. No. 09/519,767, filed Mar. 6, 2000, (Attorney Docket No. DON01 P-795); and ELEMENTAL SEMICONDUCTOR MIRROR, Ser. No. 09/533,156, filed Mar. 23, 2000, (Attorney Docket No. DON04 P-809), the disclosures of which are hereby incorporated by reference herein in their entireties.

Additionally, the mirror assembly may include circuitry for mirror mounted video cameras, which are used to visually detect the presence of moisture on the windshield and actuate windshield wipers accordingly, such as described in U.S. Pat. No. 6,097,023 entitled VEHICLE HEADLIGHT CONTROL USING IMAGING SENSOR, U.S. patent application Ser. No. 09/599,979, filed Jun. 22, 2000 (Attorney Docket No. DON01 P-816), or U.S. patent application Ser. No. 09/441,341, filed Nov. 16, 1999 (Attorney Docket No. DON01 P-770), or mirror mounted cameras for vehicle internal cabin monitoring, such as disclosed in U.S. Pat. Nos. 5,877,897; 5,550,677; and 5,760, 962, all commonly assigned to Donnelly Corporation, which are hereby incorporated herein by reference in their entireties, or mirror mounted cameras for rear vision systems, such as disclosed in U.S. Pat. Nos. 5,959,367; 5,929,786; 5,949,331; 5,914,815; 5,786,772; 5,798,575; 5,670,935; 6,198,409; 6,201,642; and 6,222,447; and pending U.S. patent applications entitled VEHICLE MIRROR DIGITAL NETWORK AND DYNAMICALLY INTERACTIVE MIRROR SYSTEM, Ser. No. 09/375,315, filed Aug. 16, 1999 (Attorney Docket No. DON01 P-769); VEHICLE CAMERA DISPLAY, Ser. No. 09/776,625, filed Feb. 5, 2001, by Kenneth Schofield et al. (Attorney Docket No. DON01 P-874); VEHICLE MIRROR DIGITAL NETWORK AND DYNAMICALLY INTERACTIVE MIRROR SYSTEM, Ser. No. 09/375,315, filed Aug. 16, 1999; WIDE ANGLE IMAGE CAPTURE SYSTEM FOR VEHICLES, Ser. No. 09/199,907, filed Nov. 25, 1998 (Attorney Docket DON01 P-676); WIDE ANGLE IMAGING SYSTEM, Ser. No. 09/767,939, filed Jan. 23, 2001 (Attorney Docket DON08 P-871); VEHICLE IMAGING SYSTEM WITH STEREO IMAGING, Ser. No. 09/372,915, filed Aug. 12, 1999 (Attorney Docket DON08 P-742); and VEHICLE REARVIEW MIRROR DISPLAY SYSTEM, Ser. No.

09/300,201, filed May 3, 1999, which are all commonly assigned to Donnelly Corporation of Holland, Mich., the disclosures of which are all hereby incorporated herein by reference in their entireties.

Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. For example, when the driver selects a reverse gear, a view of the back-seat of the vehicle is automatically replaced with a view rearward of the vehicle provided by the rearward-facing reverse-aid camera (typically mounted at the vehicle rear license plate area or the like) and when reverse gear is disengaged, the view of the back-seat is once again displayed at the display screen visible to the driver in the interior cabin of the vehicle (such as at, on, or in the interior rearview mirror assembly).

Optionally, and preferably, the vehicle equipped with the rearview mirror assembly of the present invention is also equipped with a forward facing night vision system (such as a system utilizing a micro-bolometer array capable of imaging thermal energy, or one equipped with infrared forward facing lighting, such as infrared laser diode headlamps, and a forward facing camera sensitive to such infrared lighting, or such as a system described in commonly assigned U.S. patent application Ser. No. 09/793,002, filed Feb. 26, 2001 by Schofield et al. for VIDEO MIRROR SYSTEMS INCORPORATING AN ACCESSORY MODULE (Attorney Docket No. DON01 P-869), which is hereby incorporated herein by reference) and a reversing camera system (such as described in U.S. patent application Ser. No. 09/793,002). The vehicle is also equipped with a video screen capable of displaying an image generated by either of the front facing night vision imaging system and the rear facing backup camera system. Thus, for example, a driver can select the display of the forward facing night vision camera on the video screen when driving at night. However, when the reverse gear is selected, the image generated by the reversing camera system is automatically displayed on the video screen. Upon shifting out of reverse gear again, the night vision image is automatically redisplayed on the video screen. Optionally, the driver may manually select which image (such as the image from the front facing night vision camera system, the rear facing backup camera system or the system generating a view of the rear seat of the vehicle, or any other camera system of the vehicle) is displayed on the video screen.

The optional mirror-mounted video screen (whether a display screen mounted at or part of rearview mirror assembly, as part of the movable housing that houses the mirror reflector element, or as a module attached to the mirror support mounting arm or attached to the mirror button or attached to the mount of the mirror support arm to a windshield mounted button or a header mounted plate or attached to a mirror mounting button or a header mounting plate, of which examples of such suitable mounting arrangements can be found in U.S. Pat. Nos. 5,487,522; 5,671,996; 5,820,097; 5,615,857; 5,330,149; 5,100,095; 4,930,742; or 4,936,533, all commonly assigned to Donnelly Corporation, the disclosures of which are hereby incorporated herein by reference in their entireties) can form a viewing screen for a baby minder system, such as the vehicle interior monitoring system described in U.S. Pat. Nos. 5,877,897 and 5,760,962 or the rear vision systems described in U.S. Pat. No. 6,201,642, or in pending U.S. patent applications Ser. No. 09/199,907, filed Nov. 25, 1998; Ser. No. 09/767,939, entitled WIDE ANGLE IMAGING SYSTEM, filed Jan. 23, 2001 (Attorney Docket No. DON08 P-871); and Ser. No. 09/433,467, filed Nov. 4, 1999 by Heslin et al., entitled VEHICLE INTERIOR MIRROR ASSEMBLY, all of which are hereby incorporated herein by reference in their entireties. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger, such as children.

Note that communication between any camera and a display screen can be by wire (such as a direct wire connection or via an optical fiber link)or via a bus system (such as a CAN or LIN system, as known in the arts) or wirelessly such as by IR or RF communication (such as using a local area RF broadcast network such as the BLUE-TOOTH protocol from Motorola).

Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electro-luminescent sources (both organic and inorganic), and the like, and most preferably such non-incandescent sources are low power and are directed low intensity sources, such as described in U.S. Pat. Nos. 5,938,321 and 6,139,172, and in co-pending U.S. patent application entitled INTERIOR MIRROR ASSEMBLY FOR A VEHICLE INCORPORATING A SOLID-STATE LIGHT SOURCE, Ser. No. 09/626,608, filed Jul. 27, 2000 (Attorney Docket No. DON01 P-829), which are hereby incorporated herein by reference in their entireties.

A baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electro-luminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational.

Optionally, the selected camera (preferably a CCD and, most preferably, a solid state CMOS camera) is sensitive in the near-infrared region and most preferably thus has at least some night vision capability. Most preferably, the illumination is provided (preferably, mounted at and illuminating from the mounting site of the camera itself) by one or more near-infrared illumination sources, such as light emitting diodes (such as red or orange light emitting diodes or IR emitting diodes) which emit efficiently in the near-infrared portion (wavelengths from approximately 0.75 microns to about 1.5 microns), but which do not emit efficiently in the visible portion (wavelengths below approximately 0.75 microns) of the electromagnetic spectrum. IR-emitting diodes suitable to illuminate an interior cabin portion of a vehicle, such as a baby seat mounted on a rear seat, for use in conjunction with a camera capturing a video image of that portion, are available from LUMEX Incorporated of Palatine, Ill. For example, a plurality of at least two, and preferably at least four, LUMEX OED-EL-1L2 IR-emitting diodes can be used to illuminate a vehicle portion by a video camera (preferably a solid-state CMOS multi-pixel-array camera that, most preferably, does not include an infrared filter over its lens). The LUMEX OED-EL-1L2 IR-emitting diode has a peak radiation output at around 940 mm, and is provided as a T-5 mm leaded case with a clear epoxy lens, and operates at a forward current of up to 100 milli-amps.

Therefore, a local area of the interior cabin of the vehicle (such as an area occupied by a child seat) may be illuminated with near-IR radiation in a range which the camera is sensitive to, such that the system can form a clear image of the area on the display, while the cabin is not illuminated with visible light which, at night, may be sufficient to cause glare or discomfort to the driver and/or passengers in the illuminated area. Also, when using such low-level lighted, directed light sources such as LED's to illuminate the portion of the vehicle cabin being imaged by an in-cabin camera or cameras, the like of a child sleeping in a child seat will not be disturbed by the incident light beam, particularly when its emitted intensity is principally in the infrared region that is invisible to the human eye.

While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source, such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status.

Light emitting sources, such as light emitting diodes, can be used to provide visible signals or lighting for any camera at the mirror assembly or within or exteriorly of the vehicle. Light emitting diodes (LEDs) can be used to provide illumination in various colors such as white, amber, yellow, green, orange red, blue, or their combination, or the like may be used. Alternately, other light emitting elements can be used to provide illumination for any camera that feeds an image to the mirror-mounted video screen, such as incandescent sources, fluorescent sources including cold-cathode fluorescent sources, electro-luminescent sources (both organic and inorganic) such as described in U.S. Pat. Nos. 5,938,321 and 6,139,172, and co-pending U.S. patent application entitled INTERIOR MIRROR ASSEMBLY FOR A VEHICLE INCORPORATING A SOLID-STATE LIGHT SOURCE, Ser. No. 09/626,608, filed Jul. 27, 2000, which are incorporated herein by reference in their entireties, and in such as is disclosed in co-pending and co-assigned U.S. patent application Ser. No. 09/466,010, filed Dec. 17, 1999 (Attorney Docket No. DON01 P-787), the entire disclosure of which is hereby incorporated by reference herein, and in co-pending and co-assigned U.S. pat. application Ser. No. 09/449,121, filed Nov. 24, 1999 by Hutzel et al. of Donnelly Corporation, entitled REARVIEW MIRROR ASSEMBLY WITH UTILITY FUNCTIONS, and U.S. patent application Ser. No. 09/585,379, filed Jun. 1, 2000, entitled REARVIEW MIRROR ASSEMBLY WITH UTILITY FUNCTIONS, the entire disclosures of which are hereby incorporated by reference herein. The light source can include a lens, which may be supplied as a segmented lens, a prismatic lens, or a Fresnel lens, which may be clear or tinted, may be provided over such light source.

The concepts of the present invention can be used with interior rearview mirror assemblies which are equipped with a variety of features and accessories, such as a home access transmitter, garage door opener transmitters, a high/low (or daylight running beam/low) headlamp controller, a hands free phone attachment, a video telephone function, a remote keyless entry receiver, a compass, a seat occupancy detection, map lights or multiple reading lights such as described in commonly assigned U.S. Pat. Nos. 6,000,823; 5,669,698; 5,820,245; 5,671,996; 5,813,745; 5,178,448; 4,733,336; and 4,646,210 and co-pending U.S. patent applications Ser. No. 09/371,871, filed Aug. 6, 1999 (Attorney Docket No. DON01 P-765), and Ser. No. 09/712,742, filed Nov. 14, 2000 (Attorney Docket No. DON01 P-852), the disclosures of all of which are hereby incorporated herein by reference in their entireties. Additional features and accessories that may be incorporated into the rearview mirror assemblies include: a trip computer, an intrusion detector, displays indicating, for example passenger air bag status, including information displays such as a PSIR (Passenger Side Inflatable Restraint) display, an SIR (Side-Airbag Inflatable Restraint), compass/temperature display, a tire pressure status display or other desirable displays and the like, such as those described in U.S. Pat. No. 6,172,613, the disclosure of which is hereby incorporated by reference herein. For example, rearview mirror assemblies may include: antennas, including GPS or cellular phone antennas, such as disclosed in U.S. Pat. Nos. 5,971,552 and 6,019,475, and co-pending U.S. patent application Ser. No. 09/477,539, filed Jan. 4, 2000; a communication module, such as disclosed in U.S. Pat. No. 5,798,688; displays, such as shown in U.S. Pat. Nos. 5,530,240; 6,087,953; or 6,172,613; blind spot detection systems, such as disclosed in U.S. Pat. Nos.

5,929,786 or 5,786,772; transmitters and/or receivers, such as garage door openers; a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as described previously and/or such as disclosed in U.S. Pat. Nos. 5,760,962 and 5,877,897 and co-pending U.S. patent application Ser. No. 09/433,467; a remote keyless entry receiver; map lights, such as disclosed in U.S. Pat. Nos. 5,938,321; 5,813,745; 5,820,245; 5,673,994; 5,649,756; or 5,178,448; microphones and/or speakers, such as disclosed in U.S. patent applications Ser. No. 09/382,720, filed Aug. 25, 1999, and Ser. No. 09/396,179, filed Sep. 14, 1999; a compass, such as disclosed in U.S. Pat. No. 5,924,212; a seat occupancy detector; a trip computer; an ONSTAR System or the like, with all of the referenced patents and applications being commonly assigned to Donnelly Corporation, the disclosures of which are all hereby incorporated herein by reference in their entireties.

The interior rearview mirror assembly may also include a compass/temperature and a clock display, fuel level display, and other vehicle status and other information displays. Furthermore, information displays may be incorporated which provide information to the driver or occupants of the vehicle, such as warnings relating to the status of the passenger airbag. In commonly assigned U.S. Pat. No. 6,172,613, the disclosure of which is hereby incorporated herein by reference in its entirety, information displays are provided which include information relating to vehicle or engine status, warning information, and the like, such as information relating to oil pressure, fuel remaining, time, temperature, compass headings for vehicle direction, and the like. The passenger side air bag on/off signal may be derived from various types of seat occupancy detectors such as by video surveillance of the passenger seat as disclosed in co-pending, commonly assigned International Pat. Application Ser. No. PCT/US94/01954, filed Feb. 25, 1994 and published Sep. 1, 1994 as International Publication No. WO 94/19212 (Attorney Docket No. DON01 FP-878 (PCT)), the disclosure of which is hereby incorporated herein by reference, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which the assembly is mounted as described in commonly assigned U.S. Pat. No. 5,786,772, which is hereby incorporated by reference herein in its entirety.

In addition, the interior rearview mirror assemblies may include electronic and electric devices, including a blind spot detection system, such as described above or as the type disclosed in U.S. Pat. No. 5,786,772 for VEHICLE BLIND SPOT DETECTION AND DISPLAY SYSTEM, or rain sensor systems, such as described in U.S. patent applications, Ser. No. 09/599,979, filed Jun. 22, 2000 (Attorney Docket No. DON01 P-816); Ser. No. 09/530,306, filed Apr. 27, 2000 (Attorney Docket No. DON01 P-708A); and/or Ser. No. 09/346,352, filed Jul. 2, 1999 (Attorney Docket No. DON01 P-745), including rain sensor systems which include windshield contacting rain sensors, such as described in U.S. Pat. No. 4,973,844 entitled VEHICULAR MOISTURE SENSOR AND MOUNTING APPARATUS THEREFOR, or non-windshield contacting rain sensors, such as described in PCT International Application PCT/US94/05093 entitled MULTI-FUNCTION LIGHT SENSOR FOR VEHICLE, published Nov. 24, 1994 as International Publication No. WO 94/27262, the disclosures of all of which are hereby incorporated herein by reference in their entireties.

Optionally, and as disclosed in U.S. patent applications Ser. No. 09/449,121, filed Nov. 24, 1999 (Attorney Docket No. DON01 P-778), and Ser. No. 09/585,379, filed Jun. 1, 2000 (Attorney Docket No. DON01 P-817), the entire disclosures of which are hereby incorporated by reference herein, the interior rearview mirror assembly may comprise accessories that can be docked to the assembly for purpose of storage, battery charging, electrical powering, data input and/or output, and similar functions. Such dockable features are detachable by a user of the vehicle from the mirror assembly and are optionally removable from the vehicle for use outside the vehicle. For example, a dockable feature may comprise a light assembly, such as a flashlight assembly, or may comprise a cellular phone, a phone module, pager, INTERNET connector, or the like. In the case of docking a telecommunication device such as a phone or a pager, the interior mirror assembly is preferably adapted to connect to the telecommunication device such as a phone in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

Preferably, the interior rearview mirror assembly includes a power source, such as a recharger that recharges the battery or batteries in any dockable accessory, which is stored or attached thereto. In this manner, the dockable accessory can be docked for recharging. In the case of the light assembly, the light assembly can be docked for use as a map reading light or the like. When undocked, the light assembly (which includes internal batteries) may be used as a flashlight, as previously noted.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in U.S. provisional application, Ser. No. 60/131,593, filed Apr. 29, 1999 (Attorney Docket No. DON01 P-744), and U.S. patent application Ser. No. 09/561,023, filed Apr. 28, 2000, now U.S. Pat. No. 6,553,308 (Attorney Docket No. DON01 P-819), both entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, which are hereby incorporated herein by reference in their entireties. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

A variety of electrical and electronic features can be incorporated into the interior rearview mirror assembly, such as those disclosed in U.S. patent application Ser. No. 09/433, 467, filed Nov. 4, 1999 by Heslin et al., entitled VEHICLE INTERIOR MIRROR ASSEMBLY, and U.S. patent application Ser. No. 09/734,440, filed Dec. 11, 2000 (Attorney Docket No. DON01 P-867), commonly assigned to Donnelly Corporation, which are herein incorporated by reference in their entireties. For example, a microphone or a plurality of microphones may be incorporated, preferably to provide hands-free input to a wireless telecommunication system such as the ONSTAR™ system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, the disclosure of which is hereby incorporated by reference herein. Microphones, sound processing systems, and other accessories suitable to use in the mirror systems of the present invention are disclosed in co-pending and commonly assigned U.S. patent applications, Ser. No. 09/466,010, filed Dec. 17, 1999 (Attorney Docket No. DON01 P-787); Ser. No. 09/396,179, filed Sep. 14, 1999 (Attorney Docket No. DON01 P-776); Ser. No. 09/382,720, filed Aug. 25, 1999 (Attorney Docket No. DON01 P-768); Ser. No. 09/449,121, filed Nov. 24, 1999 (Attorney Docket No. DON01 P-778); Ser. No. 09/433,467, filed Nov. 4, 1999 (Attorney Docket No. DON01 P-783); and Ser. No. 09/448,700, filed Nov. 24, 1999 (Attorney Docket No. DON01 P-702), the entire disclosures of all of which are hereby incorporated by reference herein.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865, entitled A METHOD FOR INDICATING THE PRESENCE OF SPEECH IN AN AUDIO SIGNAL, issued Sep. 25, 1990 to Stettiner et al. (the disclosure of which is hereby incorporated by reference herein), are particularly useful to enhance clarity of vocal signal detection when a single microphone is used, located in the interior mirror assembly such as in the mirror casing that houses the interior mirror reflective element, as part of a vehicular wireless communication system such as General Motors' ONSTAR™ system. Use of digital signal processing and a single mirror-mounted microphone (such as is described in U.S. patent application Ser. No. 09/466,010, filed Dec. 17, 1999, entitled INTERIOR REARVIEW MIRROR SOUND PROCESSING SYSTEM (Attorney Docket No. DON01 P-787), the disclosure of which is hereby incorporated by reference herein) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region), digital sound processing is also beneficial when multiple microphones are used, and preferably when at least two and more preferably at least four microphones are used. Also, noise cancellation techniques, such as destructive interference, can advantageously be used whereby the signal as picked up by the microphone is processed, the human vocal signal is distinguished from the noise signal, and whereby the noise signal is fed back 180° out of phase with itself in order to cancel out the noise by destructive interference and so enhance the vocal signal to background noise ratio.

Preferably, the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, and/or use of a directed microphone directed to a potential human speaker in conjunction with a more omnidirectional microphone intended to detect background noise can be used. An adaptive signal processing system can be used to enhance vocal to noise ratio. Mechanical cancellation of ambient noise can be provided, as can a noise canceling pressure gradient microphone, preferably in conjunction with acoustic ports including voice and noise ports. Such a system is disclosed in World Pat. publication No. WO 9817046, published Apr. 23, 1998 to D. Andrea, the disclosure of which is hereby incorporated herein by reference in its entirety.

In addition, the interior rearview mirror assembly may incorporate one or more user actuatable buttons or the like for activating the various accessories housed in the assembly, for example an ONSTAR system, HOMELINK® system, a remote transaction system, or the like. For example, one or more user actuatable buttons may be mounted at the chin area or eyebrow area for actuating the video screen or for selecting or scrolling between displays or for activating, for example, a light, including a map light which may be incorporated into the mirror casing. Furthermore, a dimming switch may be incorporated into the casing to provide adjustment to the brightness of the video screen.

The video mirror assemblies, the in-cabin video displays mounted separate from an interior mirror assembly of a vehicle and/or any camera mounting assembly discussed above, may house a plurality of electrical or electronic devices, such as antennas, including global positioning system (GPS) or cellular phone antennas, such as disclosed in U.S. Pat. No. 5,971,552, and U.S. provisional application entitled COMPLETE MIRROR-BASED GLOBAL-POSITIONING SYSTEM (GPS) NAVIGATION SOLUTION, Ser. No. 60/187,960, filed Mar. 9, 2000 (Attorney Docket No. DON01 P-810), and U.S. patent application Ser. No. 09/799,414, filed Mar. 5, 2001 (Attorney Docket No. DON01 P-887), communication modules or systems, such as disclosed in U.S. Pat. No. 5,798, 688, and U.S. provisional application entitled VEHICLE MIRROR ASSEMBLY COMMUNICATING WIRELESSLY WITH VEHICLE ACCESSORIES AND OCCUPANTS, Ser. No. 60/199,676, filed Apr. 21, 2000 (Attorney Docket No. DON01 P-818), and U.S. patent application Ser. No. 09/839,678, filed Apr. 20, 2001 (Attorney Docket No. DON01 P-902), displays, such as shown in U.S. Pat. Nos. 5,530,240 and/or 6,172,613, and/or co-pending U.S. patent application entitled REARVIEW MIRROR ASSEMBLY WITH ADDED FEATURE MODULAR DISPLAY, Ser. No. 09/448,700, filed Nov. 24, 1999 by Timothy Skiver et al. (Attorney Docket No. DON01 P-702), blind spot detection systems, such as disclosed in U.S. Pat. Nos. 5,929,786 or 5,786,772, transmitters and/or receivers, such as garage door openers and/or the like, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176 and co-pending U.S. patent application entitled MEMORY MIRROR SYSTEM FOR VEHICLE, Ser. No. 09/572,008, filed May 16, 2000 (Attorney Docket No. DON01 P-804), a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, speakers, a compass, such as disclosed in U.S. Pat. No. 5,924,212, seat occupancy detector, a trip computer, an ONSTAR System or the like, with all of the above referenced patents and applications being commonly assigned to Donnelly Corporation, and the disclosures of all of which are hereby incorporated herein by reference in their entireties.

Also, any video display, video mirror display and/or camera assembly implemented in connection with the mirror assembly of the present invention may also incorporate an in-vehicle train approaching warning system. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in pending U.S. patent application entitled VEHICLE BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000 by Uhlmann et al., now U.S. Pat. No. 6,553,308 (Attorney Docket No. DON01 P-819), the entire disclosure of which is hereby incorporated by reference herein in its entirety. Vehicle to road-side communication antennas can be attached to railroad signs, crossing barriers, and the like and can transmit to antennas mounted in the vehicle located such as within the interior rearview mirror of the vehicle or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

In addition, any of the video displays and/or cameras discussed above may incorporate or comprise a component of a security system which employs various cameras, which can be provided at strategic locations around the vehicle, including interior cameras and exterior cameras, and are coupled to a telemetry system and preferably to a navigational system such as a GPS system. Interior-cabin viewing (and/or exterior viewing) cameras can be located in or at the interior rearview mirror assembly (and/or in or at either or both of the exterior side view mirror assemblies mounted to the side of the vehicle) and/or in or at the front windshield of the vehicle and/or in or at the A-pillars and/or in or at another location in the cabin such as a B-pillar or a C-pillar or a roof area. Also, the vehicle can be equipped with telemetry and GPS systems. Optionally, one or more of the cameras of the vehicle may be equipped with infrared LED light emitting sources, such as are disclosed in U.S. Pat. No. 6,087,953 entitled REARVIEW MIRROR SUPPORT INCORPORATING VEHICLE INFORMATION DISPLAY, and U.S. Pat. No. 6,172,613 entitled REARVIEW MIRROR ASSEMBLY INCORPORATING VEHICLE INFORMATION DISPLAY, and in U.S. patent application entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000 by Uhlmann et al., now U.S. Pat. No. 6,553,308 (Attorney Docket No. DON01 P-819), and in U.S. patent application entitled INTERIOR REARVIEW MIRROR INCLUDING DIGITAL SOUND PROCESSING SYSTEM, Ser. No. 09/466,010, filed Dec. 17, 1999, which are all incorporated by reference herein in their entireties, in order to light up an area in or around the vehicle when it is dark. When an intrusion detector such as a motion detector (preferably a pyrodetector-based intrusion detection system such as is disclosed in commonly assigned U.S. Pat. No. 6,166,625 entitled PYROELECTRIC INTRUSION DETECTION IN MOTOR VEHICLES, and co-pending commonly assigned U.S. patent application entitled SAFETY RELEASE FOR A TRUNK OF A VEHICLE, Ser. No. 09/516,831, filed Mar. 1, 2000 (Attorney Docket No. DON01 P-796), and/or U.S. patent application entitled SAFETY SYSTEM FOR A CLOSED COMPARTMENT OF A VEHICLE, Ser. No. 09/648,560, filed Aug. 25, 2000 (Attorney Docket No. DON01 P-807), and/or U.S. Pat. No. 6,086,131 entitled SAFETY HANDLE FOR TRUNK OF VEHICLE, the disclosures of which are herein incorporated by reference herein in their entireties) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C-interior pillar) and seat backs, and such as are disclosed in co-pending, commonly assigned U.S. patent application Ser. No. 09/799,993, filed Mar. 6, 2001 by Bos for NON-CIRCULAR APERTURE STOP, now U.S. Pat. No. 6,538,827 (Attorney Docket No. DON01 P-877); commonly assigned U.S. provisional application entitled INTERACTIVE AUTOMOTIVE REARVIEW SYSTEM, Ser. No. 60/192,721, filed Mar. 27, 2000 (Attorney Docket No. DON01 P-815), and U.S. patent application, Ser. No. 09/817,874, filed Mar. 26, 2001 (Attorney Docket No. DON01 P-889); commonly assigned U.S. provisional application entitled INTERIOR REARVIEW MIRROR ASSEMBLY INCORPORATING A VIDEO SCREEN, Ser. No. 60/186,520, filed Mar. 1, 2000 (Attorney Docket No. DON01 P-802), and U.S. patent application Ser. No. 09/793,002, filed Feb. 26, 2001; U.S. patent applications entitled VEHICLE MIRROR DIGITAL NETWORK AND DYNAMICALLY INTERACTIVE MIRROR SYSTEM, Ser. No. 09/375,315, filed Aug. 16, 1999; WIDE ANGLE IMAGE CAPTURE SYSTEM FOR VEHICLES, Ser. No. 09/199,907 filed Nov. 25, 1998; VEHICLE IMAGING SYSTEM WITH STEREO IMAGING, Ser. No. 09/372,915, filed Aug. 12, 1999; and VEHICLE REARVIEW MIRROR DISPLAY SYSTEM, Ser. No. 09/300,201, filed May 3, 1999; and U.S. Pat. Nos. 5,877,897; 5,760,962; 5,959,367; 5,929,786; 5,949,331; 5,914,815; 5,786,772; 5,798,575; 5,670,935; 6,198,409; 6,201,642; and 6,222,447, which are all commonly assigned to Donnelly Corporation of Holland, Mich., the disclosures of which are hereby incorporated herein by reference in their entireties. For example, a camera, preferably a solid-state CMOS video camera, can be located within the interior cabin of the vehicle (and preferably located at, on or within the interior rearview mirror assembly or at or in an A-pillar), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants.

In addition, an electronic card reader, such as for a credit card or an electronic toll card or the like, may be incorporated into an accessory module. Optionally, the information relating to the transaction may be displayed on a display element. For example, the card reader may form part of a remote transaction interface system (such as is described in U.S. Pat. No. 6,158,655 and U.S. patent application Ser. No. 09/687,778, entitled VEHICLE MOUNTED REMOTE TRANSACTION INTERFACE SYSTEM, filed Oct. 9, 2000 by DeVries et al., now U.S. Pat. No. 6,547,133 (Attorney Docket No. DON01 P-851), the entire disclosures of which are hereby incorporated by reference herein). In this manner, the information relating to the transaction may be displayed on the display element or another display element located in the vehicle.

Accordingly, the concepts of this present invention can be used with other interior rearview mirror assemblies and vehicle accessories which are equipped with a variety of features and accessories, such as a home access transmitter, a high/low (or daylight running beam/low) headlamp controller, a hands free phone attachment, a video device, such as a video camera for internal cabin surveillance and/or video telephone function, a remote keyless entry receiver, a compass, a seat occupancy detection, multiple reading lights, a trip computer, an intrusion detector, and the like. Any video display, video mirror display and/or camera assembly may also include a compass/temperature and a clock display, fuel level display, and other vehicle status and other information displays, preferably electronically superimposed over the background image being displayed. Thus, for example, a driver can use a baby minder camera to view an infant seated in a rear seat via a video mirror and also see on the screen of the interior mirror assembly video mirror a compass display (or any other or additional information display desired such as GPS information) displayed also on the same screen along with the image of the infant in the rear seat.

Therefore, the present invention provides a mirror assembly which provides a status display system at a perimeter area of the reflective element of the mirror assembly. The display system is operable to refract or redirect the display information in a downward direction generally toward the head of a driver of a vehicle. Additionally, the display element may be interchangeable to provide the selected display information for an appropriate option of a particular mirror assembly and/or vehicle.

Furthermore, the mirror assembly of the present invention may include illumination sources or assemblies, such as map reading lights or the like, which are installed into the case of the mirror assembly as a unit, whereby the reflective housing of the illumination source is connected to the circuit board of the mirror assembly. A common light lens or cover may be used at the side of the mirror assembly to cover the light source assemblies and may even be operable to direct the illumination to a targeted area.

Additionally, the mirror assembly may comprise a prismatic mirror assembly and may be pivoted between a day viewing position and night viewing position via rotation of a knob or actuator. Preferably, the actuator knob comprises an outer soft touch material to improve the feel of the actuator to a user of the mirror assembly.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An interior rearview mirror assembly for a vehicle, said mirror assembly comprising:

a mirror case having a reflective element, said mirror case being adapted to mount to an interior portion of the vehicle;

an information display element positioned within said mirror case, said information display element being operable to project at a first location a light pattern indicative of information desired to be displayed, the projected light pattern being generally not readily viewable at said first location by a driver of the vehicle; and a refractive light directing element positioned at a perimeter of said reflective element and generally adjacent to said information display element, said refractive light directing element being configured to refract the light pattern projected by said information display element, said refraction of the projected light pattern by said refractive light directing element causing the projected light pattern to be displaced to a second location more readily viewable by the driver of the vehicle.

2. The interior rearview mirror assembly of claim 1, wherein said refraction of the projected light pattern causes the projected light pattern to be displaced generally laterally toward a driver side of the vehicle.

3. The interior rearview mirror assembly of claim 1, wherein said refractive light directing element has a first thickness at an upper portion and a second thickness at a lower portion, said first thickness being greater than said second thickness.

4. The interior rearview mirror assembly of claim 1, wherein said information display element is removably mounted within said mirror case.

5. The interior rearview mirror assembly of claim 1, wherein said refractive light directing element is positioned along a lower portion of said mirror case.

6. The interior rearview mirror assembly of claim 1, wherein said mirror assembly is mountable at a mounting base on an interior surface of a windshield of the vehicle.

7. The interior rearview mirror assembly of claim 6, wherein said mirror assembly is mounted at said mounting base via a double ball mounting arm being pivotally mounted between said mirror case and said mounting base.

8. The interior rearview mirror assembly of claim 1, wherein said mirror assembly comprises a prismatic mirror which is pivotable via a toggle assembly between a day and night reflective position.

9. The interior rearview mirror assembly of claim 8, wherein said toggle assembly comprises a soft touch toggle handle.

10. An interior rearview mirror assembly for a vehicle, said mirror assembly comprising:
 a mirror case having a reflective element, said mirror case being adapted to mount to the vehicle;
 a light emitting display element positioned within said mirror case and operable to project light in a direction generally rearwardly with respect to the vehicle; and a refractive light directing element positioned at a perimeter of said reflective element and generally adjacent to said display element, said refractive light directing element refracting the light from said display element generally downwardly and rearwardly toward a driver of the vehicle, said mirror assembly comprising a prismatic mirror which is pivotable via a toggle assembly between a day and night reflective position, said toggle assembly comprising a soft touch toggle handle, wherein said soft touch toggle handle comprises an inner material and an outer material over said inner material, said outer material having a material hardness of less than approximately 70 Shore A Durometer hardness.

11. The interior rearview mirror assembly of claim 9, wherein said soft touch toggle handle is formed by a two shot molding process.

12. The interior rearview mirror assembly of claim 11, wherein said two shot molding process includes molding an inner portion having a first hardness and molding an outer portion having a second hardness over said inner portion, said first hardness being greater than said second hardness.

13. An interior rearview mirror assembly for a vehicle, said mirror comprising:
 a mirror case having a reflective element, said mirror case being adapted to mount to the vehicle;
 a light emitting display element positioned within said mirror case and operable to project light in a direction generally rearwardly with respect to the vehicle; and a refractive light directing element positioned at a perimeter of said reflective element and generally adjacent to said display element, said refractive light directing element refracting the light from said display element generally downwardly and rearwardly toward a driver of the vehicle, said mirror assembly comprising a prismatic mirror which is pivotable via a toggle assembly between a day and night reflective position, said toggle assembly comprising a soft touch toggle handle, said soft touch toggle handle being formed by a two shot molding process, said two shot molding process including molding an inner portion having a first hardness and molding an outer portion having a second hardness over said inner portion, said first hardness being greater than said second hardness, wherein said second hardness is less than approximately 70 Shore A Durometer hardness and said first hardness is greater than approximately 70 Shore A Durometer hardness.

14. The interior rearview mirror assembly of claim 1 further including at least one map light assembly positioned at a lower region of said case.

15. The interior rearview mirror assembly of claim 14 including a pair of said map light assemblies, said map light assemblies comprising a right and left map light, each map light including an illumination source, a reflector element, and a cover, at least a portion of said right and left map lights being interchangeable with one another.

16. The interior rearview mirror assembly of claim 14, wherein said map light assemblies are removably mounted at said case.

17. The interior rearview mirror assembly of claim 1 further including at least one control input for at least one of an accessory and said information display element, said control input being positioned at said case.

18. The interior rearview mirror assembly of claim 17, wherein said control input is at least one of operable to activate said information display element, operable to deactivate said information display element and operable to toggle said information display element between two or more functions.

19. The interior rearview mirror assembly of claim 17, wherein said at least one control input is backlit by an illumination source positioned within said case.

20. A prismatic interior rearview mirror assembly for a vehicle, said mirror assembly comprising:
 a mirror case having a reflective element, said mirror case being adapted to mount to a vehicle via a mounting arm, said mirror case being pivotable relative to said mounting arm; and
 a toggle member which is operable to pivot said mirror case and said reflective element between a day position and a night position, said toggle member having an outer portion and an inner portion, said outer portion comprising a soft touch material, said soft touch material having a first material hardness and said inner portion having a second material hardness, said second material hardness being greater than said first material hardness.

21. The prismatic interior rearview mirror assembly of claim 20, wherein said toggle member is formed by a two step molding process.

22. The prismatic interior rearview mirror assembly of claim 21, wherein said two step molding process includes molding said inner portion of said toggle member and molding said outer portion of said toggle member at said inner portion.

23. A prismatic interior rearview mirror assembly for a vehicle, said mirror assembly comprising:
 a mirror case having a reflective element, said mirror case being adapted to mount to a vehicle via a mounting arm, said mirror case being pivotable relative to said mounting arm; and
 a toggle member which is operable to pivot said mirror case and said reflective element between a day position and a night position, said toggle member having an outer portion and an inner portion, said outer portion comprising a soft touch material, said soft touch material having a first material hardness and said inner portion having a second material hardness, said second material hardness being greater than said first material hardness, said toggle member being formed by a two step molding process, said two step molding process including molding said inner portion of said toggle member and molding said outer portion of said toggle member at said inner portion, wherein said first material hardness is less than approximately 70 Shore A Durometer hardness and said second material hardness is greater than approximately 70 Shore A Durometer hardness.

24. The prismatic interior rearview mirror assembly of claim 20 further including a display element positioned within said mirror case and operable to project light rearwardly with respect to the vehicle and a refractive light directing element positioned at a perimeter of said reflective element and rearwardly of said display element, said refractive light directing element refracting the light from said display element downwardly toward a driver of the vehicle.

25. The prismatic interior rearview mirror assembly of claim 24, wherein said refractive light directing element refracts the light from said display element generally laterally toward the driver of the vehicle.

26. The prismatic interior rearview mirror assembly of claim 24, wherein said refractive light directing element has a first thickness along an upper portion and a second thickness along a lower portion, said first thickness being greater than said second thickness.

27. The prismatic interior rearview mirror assembly of claim 24, wherein said display element is removably mounted within said mirror case.

28. The prismatic interior rearview mirror assembly of claim 24, wherein said refractive light directing element is positioned along a lower portion of said mirror case.

* * * * *

UNITED STATES PATENT AND TRADEMARK OFFICE
CERTIFICATE OF CORRECTION

| | | |
|---|---|---|
| PATENT NO. | : 6,648,477 B2 | |
| APPLICATION NO. | : 09/899474 | |
| DATED | : November 18, 2003 | |
| INVENTOR(S) | : Barry W. Hutzel, Rick Mousseau and Darryl P. DeWind | |

It is certified that error appears in the above-identified patent and that said Letters Patent is hereby corrected as shown below:

Column 3:
Line 5, Insert --, now U.S. Pat. No. 6,477,464,-- after "2001".

Column 4:
Line 54, Insert --now U.S. Pat. No. 6,329,925,-- after "DISPLAY".

Column 5:
Line 52, Insert --now U.S. Pat. No. 6,329,925,-- after "DISPLAY".

Column 6:
Line 5, Insert --now U.S. Pat. No. 6,329,925,-- after "DISPLAY".
Line 10, Insert --, now U.S. Pat. No. 6,318,870-- after "mirror".
Line 62, Insert --, now U.S. Pat. No. 6,243,003,-- after "Lynam".

Column 7:
Line 6, Insert --now U.S. Pat. No. 6,428,172,-- before "and/or".
Line 35, Insert --, now U.S. Pat. No. 6,291,906,-- after "2000".
Line 39, Insert --, now U.S. Pat. No. 6,326,613,-- after "ASSEMBLY".

Column 8:
Line 24, Insert --, now U.S. Pat. No. 6,286,965,-- after "09/074,810".

Column 9:
Line 5, Insert --now U.S. Pat. No. 6,154,306,-- after "DEVICES".
Line 13, Delete "∂" After "(SPM)".

Column 10:
Line 7, Insert --now U.S. Pat. No. 6,196,688,-- before "(Attorney".
Line 25, Insert --now U.S. Pat. No. 6,305,807,-- before "(Attorney".

Signed and Sealed this
Seventeenth Day of April, 2012

David J. Kappos
*Director of the United States Patent and Trademark Office*

Line 27, Insert --now U.S. Pat. No. 6,210,008,-- before "(Attorney".
Line 30, Insert --now U.S. Pat. No. 6,196,688,-- before "(Attorney".
Line 40, Insert --, now U.S. Pat. No. 6,320,176,-- before "(Attorney".
Line 54, Insert --, now U.S. Pat. No. 6,175,164,-- after "1999".
Line 59, Insert --, now U.S. Pat. No. 6,175,164,-- after "1999".
Line 66, Insert --, now U.S. Pat. No. 6,396,397,-- after "1999".

Column 11:
Line 1, "09/300,201" should be --09/304,201--.
Line 1, Insert --now U.S. Pat. No. 6,198,409,-- after "1999,".

Column 12:
Line 3, Insert --now U.S. Pat. No. 6,326,613,-- after "ASSEMBLY".
Line 41, Insert --now U.S. Pat. No. 6,412,973,-- after "2000".

Column 14:
Line 18, Insert --now U.S. Pat. No. 6,412,973,-- after "2000,".
Line 22, Insert --, now U.S. Pat. No. 6,420,975,-- before "(Attorney".
Line 27, Insert --now U.S. Pat. No, 6,428,172-- after "FUNCTIONS,".
Line 46, Insert --, now U.S. Pat. No. 6,183,119,--, after "1999".
Line 48, Insert --, now U.S. Pat. No. 6,331,066,-- after "2000".
Line 64, Insert --, now U.S. Pat. No. 6,217,181-- before ";".

Column 15:
Line 10, Insert --, now U.S. Pat. No. 6,326,613,-- after "09/433,467".
Line 15, Insert --, now U.S. Pat. No. 6,243,003,-- after "1999" in the first occurrence.
Line 15, Insert --, now U.S. Pat. No. 6,278,377,-- after "1999" in the second occurrence.
Line 57, Insert --, now U.S. Pat. No. 6,320,176,-- after "2000".
Line 59, Insert --, now U.S. Pat. No. 6,353,932,-- after "2000".
Line 60, Insert --, now U.S. Pat. No. 6,313,454,-- after "1999".

Column 16:
Line 6, Insert --, now U.S. Pat. No. 6,428,172,-- after "1999".

Column 17:
Line 9, Insert --now U.S. Pat. No. 6,326,613,-- after "ASSEMBLY,".
Line 10, Insert --, now U.S. Pat. No. 6,366,213,-- after "2000".
Line 22, Insert --, now U.S. Pat. No. 6,243,003,-- after "1999".
Line 27, Insert --, now U.S. Pat. No. 6,420,975,-- after "1999".
Line 28, Insert --, now U.S. Pat. No. 6,278,377,-- after "1999".
Line 29, Insert --, now U.S. Pat. No. 6,243,003,-- after "1999"
Line 31, Insert --, now U.S. Pat. No. 6,428,172,-- after "1999".
Line 32, Insert --, now U.S. Pat. No. 6,326,613,-- after "1999".
Line 34, Insert --, now U.S. Pat. No. 6,329,925,-- after "1999".
Line 56, Insert --, now U.S. Pat. No. 6,420,975,-- after "SYSTEM".

CERTIFICATE OF CORRECTION (continued)
U.S. Pat. No. 6,648,477 B2

Column 18:
Line 60, Insert --, now U.S. Pat. No. 6,477,464,-- after "2001".

Column 19:
Line 7, Insert --, now U.S. Pat. No. 6,329,925,-- after "et al.".

Column 20:
Line 23, Insert --now U.S. Pat. No. 6,420,975,-- after "1999,".
Line 32, Insert --, now U.S. Pat. No. 6,390,529,-- after "2000:".
Line 35, Insert --, now U.S. Pat. No. 6,485,081,-- after "2000".

Column 21:
Line 12, Insert --, now U.S. Pat. No. 6,175,164,-- after "1999".
Line 16, Insert --, now U.S. Pat. No. 6,396,397,-- after "1999".
Line 17, "09/300,201" should be --09/304,201--.
Line 18, Insert --, now U.S. Pat. No. 6,198,409,-- after "1999".

Column 23:
Line 48, Claim 13, Insert --assembly-- after "mirror".